(12) United States Patent
Shiozaki et al.

(10) Patent No.: US 8,037,779 B2
(45) Date of Patent: Oct. 18, 2011

(54) SPEED CHANGE CONTROL DEVICE OF VEHICULAR TRANSMISSION

(75) Inventors: Tomoo Shiozaki, Saitama (JP); Akihiko Tomoda, Saitama (JP); Yoshihisa Ieda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1055 days.

(21) Appl. No.: 11/905,181

(22) Filed: Sep. 27, 2007

(65) Prior Publication Data

US 2008/0078265 A1  Apr. 3, 2008

(30) Foreign Application Priority Data

Sep. 29, 2006  (JP) ................................. 2006-270093

(51) Int. Cl.
*F16H 63/18* (2006.01)
(52) U.S. Cl. ..................................................... 74/473.36
(58) Field of Classification Search ................. 74/473.1, 74/473.12, 473.36, 473.37, 415, 425
See application file for complete search history.

(56) References Cited

U.S. PATENT DOCUMENTS

| | | | |
|---|---|---|---|
| 1,341,309 A | | 5/1920 | Firestone |
| 3,495,470 A | | 2/1970 | McCartin |
| 6,220,109 B1 | | 4/2001 | Fischer et al. |
| 7,845,249 B2 * | 12/2010 | Jayaram et al. ................. 74/335 |
| 2004/0177712 A1 * | 9/2004 | Yamamoto ................. 74/473.12 |
| 2006/0011006 A1 | 1/2006 | Suzuki et al. |
| 2008/0127766 A1 * | 6/2008 | Ogasawara ................. 74/473.16 |
| 2009/0078069 A1 * | 3/2009 | Nedachi et al. ................. 74/330 |
| 2009/0235782 A1 * | 9/2009 | Shiozaki et al. ............. 74/665 K |
| 2010/0000363 A1 * | 1/2010 | Tomoda et al. ............. 74/473.36 |
| 2010/0025180 A1 * | 2/2010 | Kanno et al. ................. 192/87.11 |
| 2010/0107796 A1 * | 5/2010 | Tomoda et al. ............... 74/473.1 |
| 2010/0185371 A1 * | 7/2010 | Tomoda .......................... 701/67 |
| 2010/0218630 A1 * | 9/2010 | Matsumoto et al. ............ 74/333 |

FOREIGN PATENT DOCUMENTS

| | | |
|---|---|---|
| DE | 101 13 161 A1 | 9/2002 |
| EA | 0 187 117 A2 | 7/1986 |
| FR | 596630 | 10/1925 |
| FR | 973472 | 2/1951 |
| JP | 8-35553 A | 2/1996 |
| JP | 2001-50389 A | 2/2001 |
| JP | 2002-317865 A | 10/2002 |
| JP | 2006-17221 A | 1/2006 |
| JP | 2006-29420 A | 2/2006 |
| WO | WO-2006/003878 A1 | 1/2006 |

* cited by examiner

*Primary Examiner* — Raymond Addie
(74) *Attorney, Agent, or Firm* — Birch, Stewart, Kolasch & Birch, LLP

(57) ABSTRACT

A speed change control device for a transmission of an internal combustion engine includes a driving means having an electric motor for rotatably driving a shift drum. The electric motor has a rotation axis orthogonal to an axis of a shift drum. A barrel cam having a cam groove rotates about an axis parallel to that of the electric motor. A transmission rotation member is interlocked and is coupled to the shift drum so as to be rotatable about the axis orthogonal to the rotation axis of the barrel cam. The transmission rotation member is provided with a plurality of engagement pins that selectively engages the cam groove. The resulting configuration allows the electric motor to be disposed inwardly with respect to an outermost side of the body of the internal combustion engine in the direction of the axis of a shift drum and improves the shift accuracy.

20 Claims, 8 Drawing Sheets

SPEED CHANGE CONTROL DEVICE OF VEHICULAR TRANSMISSION

CROSS-REFERENCE TO RELATED APPLICATION

The present application claims priority under 35 U.S.C. §119 to Japanese Patent Application No. 2006-270093, filed Sep. 29, 2006, the entire contents of which are hereby incorporated by reference.

BACKGROUND OF THE INVENTION

1. Field of the Invention

The present invention relates to a speed change control device of a vehicular transmission in which shift forks for selectively establishing gear trains of a plurality of speed change stages arranged between main shafts transmitted with power from an internal combustion engine and a countershaft connected to drive wheels are engaged with lead grooves formed on an outer periphery of a shift drum, and in which a driving means including an electric motor and rotatably driving the shift drum with power exerted by the electric motor is connected to the shift drum.

2. Description of Background Art

Such speed change control device is known from JP-A No. 2006-17221 and the like.

In the disclosure of JP-A No. 2006-17221, the electric motor having a rotation axis orthogonal to an axis of a shift drum is arranged at a position spaced apart from a shift shaft connected to a shift fork so that the power exerted from the electric motor is transmitted to the shift shaft via a coupling rod, whereby the projecting amount of the electric motor from the internal combustion engine becomes large, and furthermore, the distance between the electric motor and the shift drum becomes large thus enlarging the driving means, and the shift accuracy is affected since power is transmitted through a relatively long coupling rod.

In view of the above problems, it is an object of the present invention to provide a speed change control device of a vehicular transmission in which the driving means is miniaturized by suppressing the projecting amount of the electric motor from the internal combustion engine in the direction of the axis of the shift drum, and the shift accuracy is improved.

SUMMARY AND OBJECTS OF THE INVENTION

In order to attain the above-mentioned object, according to an embodiment of the present invention, a speed change control device of a vehicular transmission in provided in which shift forks for selectively establishing gear trains of a plurality of speed change stages arranged between main shafts transmitted with power from an internal combustion engine and a countershaft connected to drive wheels are engaged with lead grooves formed on an outer periphery of a shift drum, and in which a driving means including an electric motor and rotatably driving the shift drum with power exerted by the electric motor is connected to the shift drum. The driving means includes: the electric motor having a rotation axis in a plane orthogonal to an axis of the shift drum; a barrel cam that rotates about an axis parallel to the electric motor by power transmission from the electric motor and that has a cam groove formed on an outer periphery; and a transmission rotation member interlocked and coupled to the shift drum so as to be rotatable about an axis orthogonal to the rotation axis of the barrel cam and arranged with a plurality of engagement pins that selectively engages the cam groove.

According to an embodiment of the present invention, the internal combustion engine is mounted on a motorcycle with the axis of the shift drum lying in left and right direction.

According to an embodiment of the present invention, the driving means is arranged in the engine main body on the inner side from an outermost end position of the engine main body along the axis of the shift drum.

According to an embodiment of the present invention, when the plurality of engagement pins formed on the transmission rotation member that rotates about an axis orthogonal to a rotation axis of the barrel cam selectively engages with the cam groove on the outer periphery of the barrel cam that rotates about the axis parallel to the electric motor by power transmission from the electric motor, the power of the electric motor is transmitted to the shift drum side via the barrel cam and the transmission rotation member, whereby the projecting amount of the electric motor from the internal combustion engine in the direction of the axis of the shift drum is suppressed and the shift drum and the electric motor are arranged close to each other thereby miniaturizing the driving means and improving the shift accuracy.

According to an embodiment of the present invention, the bank angle can be set relatively large while suppressing the projecting amount in the width direction of the motorcycle.

According to an embodiment of the present invention, the driving means can be protected by the engine main body even if the motorcycle falls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
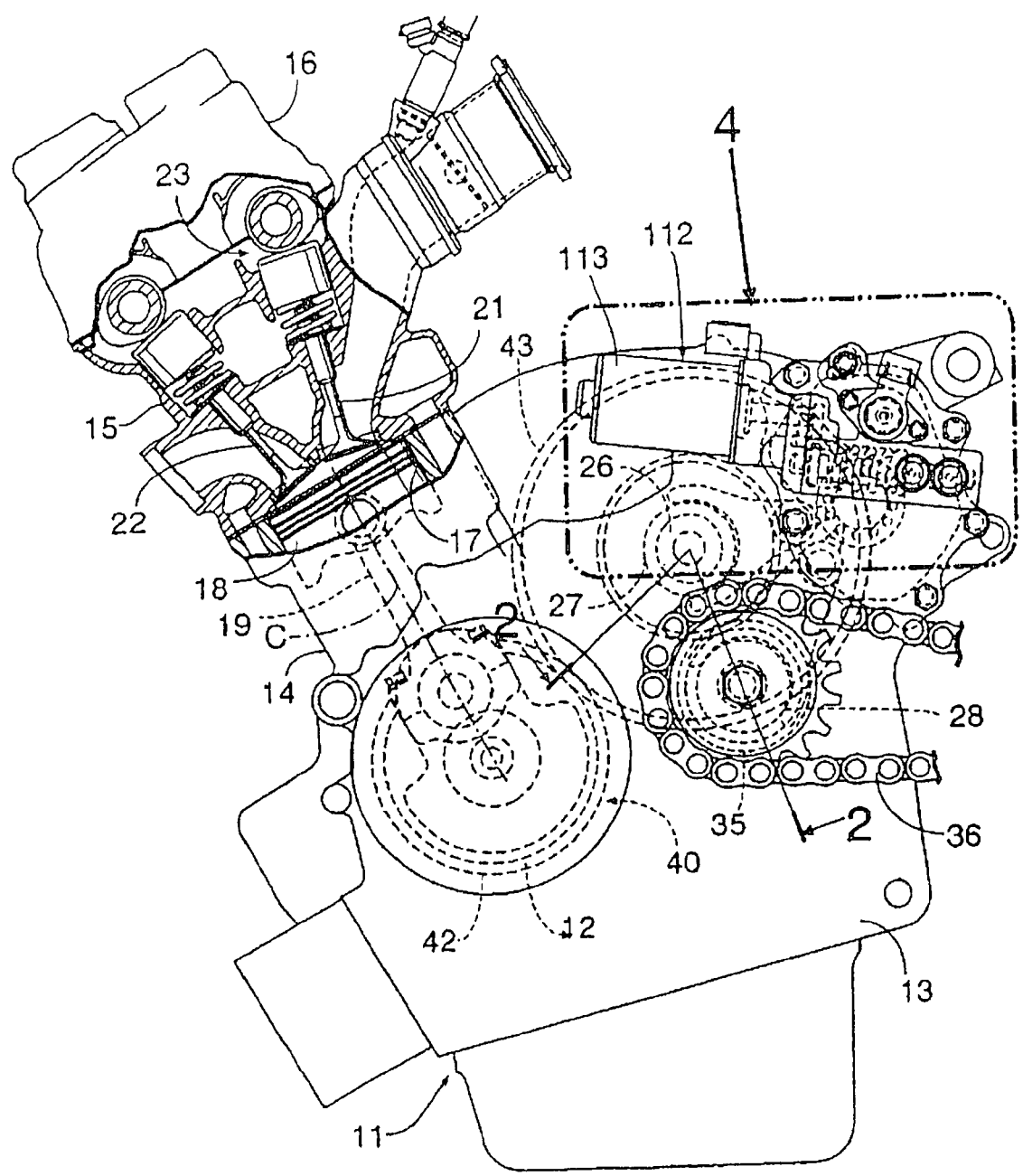
FIG. 1 is a partially cut-out side view of an internal combustion.

First, in FIG. 1, the internal combustion engine is mounted on a motorcycle, where an engine main body 11 thereof includes a crankcase 13 for rotatably supporting a crankshaft 12 along left and right direction of the motorcycle; a cylinder block 14 that includes a cylinder bore 17 to which a piston 18 connected to the crankshaft 12 by way of a connecting rod 19 is slidably fitted, and that is connected to the crankcase 13; a cylinder head 15 that forms a combustion chamber 20 to which the top of the piston 18 faces in between the cylinder block 14, and that is connected to the cylinder block 14; and a head cover 16 connected to the cylinder head 15. The axis C of the cylinder bore 17 is tilted up towards the front when mounted on the motorcycle, and a valve train 23 for open/close driving an intake valve 21 and an exhaust valve 22 arranged in the cylinder head 15 in an openable and closable manner is accommodated between the cylinder head 15 and the head cover 16.

Figure 2:
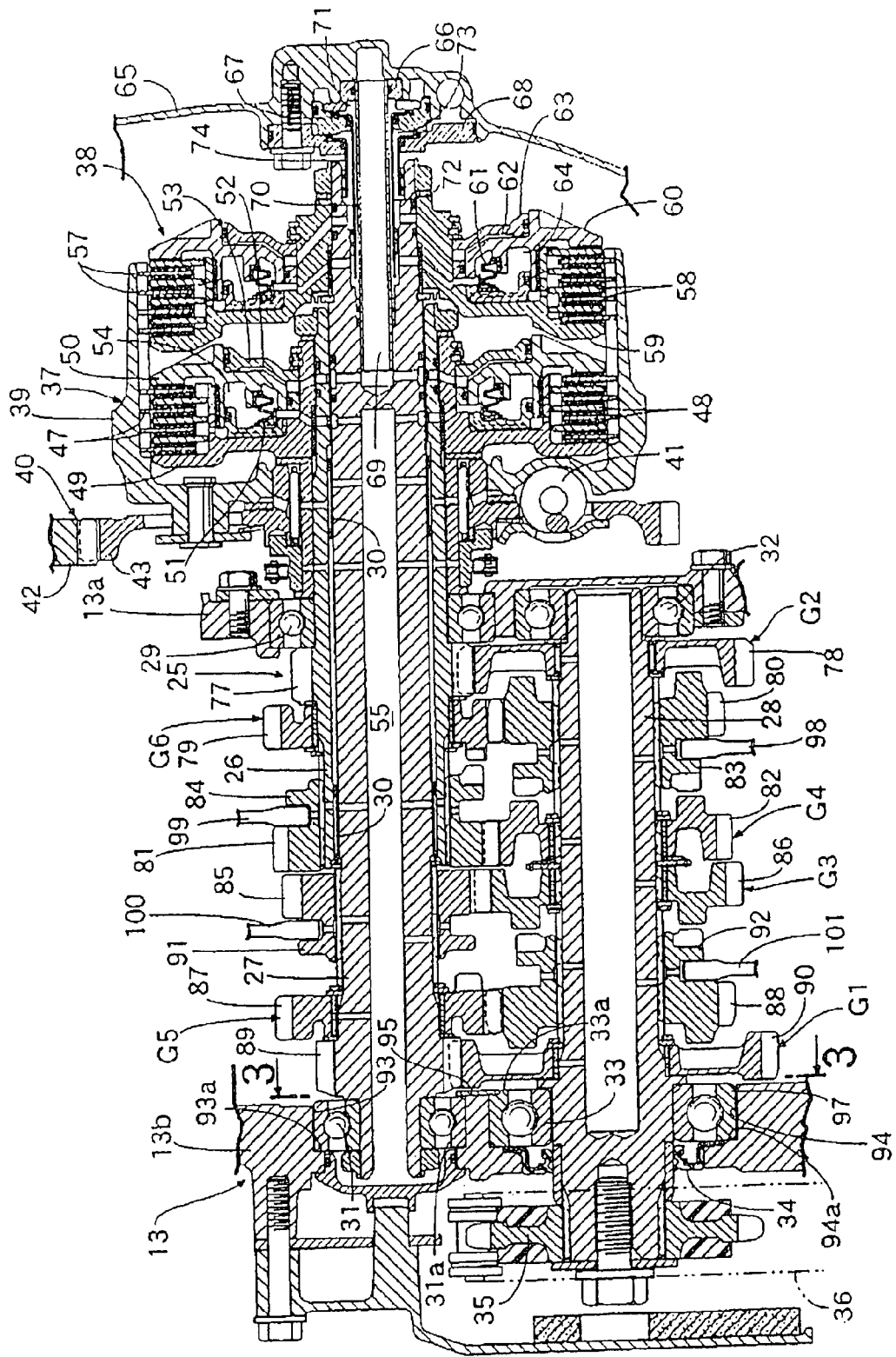
FIG. 2 is a cross sectional view taken along line 2-2 of FIG. 1.

In FIG. 2, a gear speed-change mechanism 25 including gear trains of a plurality of speed change stages that can be selectively established such as first to fourth speed gear trains G1, G2, G3, G4, G5, and G6 is accommodated in the crankcase 13, where the gear speed-change mechanism 25 has second, fourth, and sixth speed gear trains G2, G4, and G6 arranged between a first main shaft 26 and a countershaft 28 connected to rear wheels (not shown), and first, third, and fifth speed gear trains G1, G3, and G5 arranged between a second main shaft 27 that passes through the first main shaft 26 coaxially and in a relatively rotatable manner and the countershaft 28.

The crankcase 13 includes a pair of side walls 13a, 13b facing each other and spaced apart in a direction of the axis of the crankshaft 12, where the intermediate part of the first main shaft 26 having an axis parallel to the crankshaft 12 and being formed into a cylindrical shape rotatably passes through the side wall 13a with a ball bearing 29 interposed between the side wall 13a and the first main shaft 26. The second main shaft 27 having an axis parallel to the crankshaft 12 passes through the first main shaft 26 in a relatively rotatable manner while maintaining the relative position in the axial direction with respect to the first main shaft 26 constant with a plurality of needle bearings 30 interposed between the first main shaft 26 and the second main shaft 27. The other end of the second main shaft 27 is rotatably supported by the side wall 13b of the crankcase 13 by way of a main shaft ball bearing 31.

One end of the countershaft 28 having the axis parallel to the crankshaft 12 is rotatably supported by the side wall 13a by way of the ball bearing 32, the other end of the countershaft 28 is rotatably passed through the side wall 13b with a countershaft ball bearing 33 and an annular sealing member 34 interposed in between the side wall 13b, and a drive sprocket 35 is fixed to a projecting end of the countershaft 28 from the side wall 13b in such manner that a chain 36 for transmitting power to the rear wheels (not shown) can be winded thereon.

A first clutch 37 is arranged between the crankshaft 12 and one end of the first main shaft 26 of the internal combustion engine, and a second clutch 38 is arranged between the crankshaft 12 and one end of the second main shaft 27. The power from the crankshaft 12 is input to a clutch outer 39 common to the first and second clutches 37, 38 via a primary speed reducing device 40 and a damper spring 41. The primary speed reducing device 40 is formed by a drive gear 42 arranged on the crankshaft 12 and a driven gear 43 supported in a relatively rotatable manner at the first main shaft 26 and geared with the drive gear 42, where the driven gear 43 is connected to the clutch outer 39 by way of the damper spring 41.

The first clutch 37 includes the clutch outer 39; a first clutch inner 46 coaxially surrounded by the clutch outer 39 and connected to the first main shaft 26 in a relatively non-rotatable manner; a plurality of first friction plates 47 engaged with the clutch outer 39 in a relatively non-rotatable manner; a plurality of second friction plates 48 engaged with the first clutch inner 46 in a relatively non-rotatable manner and arranged alternately with the first friction plates 47; a first pressure receiving plate 49 arranged in the first clutch inner 46 facing the first and second fiction plates 47, 48 arranged overlapping each other; a first piston 50 that sandwiches the first and second friction plates 47, 48 with the first pressure receiving plate 49; and a first spring 51 for biasing the first piston 50.

An end wall member 53 forming a first hydraulic chamber 52, to which the rear surface of the first piston 50 faces, in between the first piston 50 is securely arranged to the first clutch inner 46, where the first piston 50 operates to sandwich the first and second friction plates 47, 48 with the first pressure receiving plate 49 according to increase in hydraulic pressure of the first hydraulic chamber 52, so that a connected state is obtained in which the first clutch 37 transmits the power transmitted from the crankshaft 12 to the clutch outer 39 to the first main shaft 26. A canceller chamber 54, to which the front surface of the first piston 50 faces, is formed between the first clutch inner 46 and the first piston 50, where the first spring 51 is accommodated in the canceller chamber 54 so as to apply the spring force towards the side of reducing the volume of the first hydraulic chamber 52.

A first oil passage 55 arranged coaxially with the second main shaft 27 for supplying lubricating oil to each lubricating part of a reduction gear mechanism 26 and in between first and second main shafts 26, 27 is communicated to the canceller chamber 54. Therefore, even if centrifugal force involved in the rotation acts on the oil of the first hydraulic chamber 52 in the depressurized state thereby generating force to push the first piston 50, centrifugal force also acts on the oil of the canceller chamber 54, whereby a state in which the first piston 50 undesirably moves to the side of sandwiching the first and second friction plates 47, 48 in between the first pressure receiving plate 49 is avoided.

The second clutch 38 is arranged in parallel to the first clutch 37 so as to sandwich the first clutch 37 with the primary speed reducing device 40, and includes the clutch outer 39; a second clutch inner 56 coaxially surrounded by the clutch outer 39 and connected to the second main shaft 27 in a relatively non-rotatable manner; a plurality of third friction plates 57 engaged with the clutch outer 39 in a relatively non-rotatable manner; a plurality of fourth friction plates 58 engaged with the second clutch inner 56 in a relatively non-rotatable manner and arranged alternately with the third friction plates 57; a second pressure receiving plate 59 arranged in the second clutch inner 56 facing the third and fourth fiction plates 57, 58 arranged overlapping each other; a second piston 60 that sandwiches the third and fourth friction plates 57, 58 with the second pressure receiving plate 59; and a second spring 61 for biasing the second piston 60.

An end wall member 63 forming a second hydraulic chamber 62, to which the rear surface of the second piston 60 faces, in between the second piston 60 is securely arranged in the second clutch inner 56, where the second piston 60 operates to sandwich the third and fourth friction plates 57, 58 with the second pressure receiving plate 59 according to increase in hydraulic pressure of the second hydraulic chamber 62, so that a connected state is obtained in which the second clutch 38 transmits the power transmitted from the crankshaft 12 to the clutch outer 39 to the second main shaft 27. A canceller chamber 64, to which the front surface of the second piston 60 faces, is formed between the second clutch inner 56 and the second piston 60, where the second spring 61 is accommodated in the canceller chamber 64 so as to apply the spring force towards the side of reducing the volume of the second hydraulic chamber 62.

The first and second clutches 37, 38 are covered by a first cover 65 connected to the crankcase 13, and first, second, and third partition wall members 66, 67, 68 are attached to the inner surface side of the first cover 65. Furthermore, a first tubular member 70 forming a first hydraulic supply path 69 that communicates to the first hydraulic chamber 52 of the first clutch 37 is arranged between the second main shaft 27 and the first partition wall member 66, a second tubular member 72 forming an annular second oil passage 71 that communicates to the canceller chamber 64 of the second clutch 38 in between the first tubular member 70 and coaxially surrounding the first tubular member 70 is arranged between the second main shaft 27 and the second partition wall member 67, and a third tubular member 74 forming an annular second hydraulic supply path 73 that communicates to the second hydraulic chamber 62 in between the second tubular member 72 and coaxially surrounding the second tubular member 72 is arranged between the second main shaft 27 and the third partition wall member 68.

The first and second hydraulic supply paths 69, 73 are connected to a hydraulic control device (not shown), whereby disconnection and connection of the first and second clutches 37, 38 are switch controlled by controlling the hydraulic pressure of the first and second hydraulic supply paths 69, 73, that is, the first and second hydraulic chambers 52, 62 by the hydraulic control device.

The fourth speed gear train G4, the sixth speed gear train G6, and the second speed gear train G2 are arranged in line in order from the side opposite to the first and second clutches 37, 38 between the first main shaft 26 and the countershaft 28. The second speed gear train G2 includes a second speed drive gear 77 integrally arranged with the first main shaft 26 and a second speed driven gear 78 supported in a relatively rotatable manner by the countershaft 28 and geared with the second speed drive gear 77; the sixth speed gear train G6 includes a sixth speed drive gear 79 supported in a relatively rotatable manner by the first main shaft 26 and a sixth speed driven gear 80 supported so as to be axially movable and relatively non-rotatable by the countershaft 28 and geared with the sixth speed drive gear 79; and the fourth speed gear train G4 includes a fourth speed drive gear 81 supported so as to be axially movable and relatively non-rotatable by the first main shaft 26 and a fourth speed driven gear 82 supported in a relatively rotatable manner by the countershaft 28 and geared with the fourth speed drive gear 81.

A first shifter 83 is supported in a relatively non-rotatable and axially movable manner by the countershaft 28 between the second speed driven gear 78 and the fourth speed driven gear 82 to enable switching among state of engaging the second speed driven gear 78, state of engaging the fourth speed driven gear 82, and state of not engaging either the second speed driven gear 78 or the fourth speed driven gear 82, and the sixth speed driven gear 80 is integrally arranged on the first shifter 83. The fourth speed drive gear 80 is integrally arranged on a second shifter 84 supported in a relatively non-rotatable and axially movable manner by the first main shaft 26, and the second shifter 84 is switched to engage or disengage the sixth speed drive gear 79.

The second speed gear train G2 is established by engaging the first shifter 83 to the second speed driven gear 78 without the second shifter 84 engaging the sixth speed drive gear 79; the fourth speed gear train G4 is established by engaging the first shifter 83 to the fourth speed driven train 82 without the second shifter 84 engaging the sixth speed drive gear 79; and the sixth speed gear train G6 is established by engaging the second shifter 84 to the sixth speed drive gear 79 with the first shifter 83 in the neutral state.

The first speed gear train G1, the fifth speed gear train G5, and the third speed gear train G3 are arranged in line in order from the side opposite to the first and second clutches 37, 38 between the projection of the second main shaft 27 from the other end of the first main shaft 26 and the countershaft 28. The third speed gear train G3 includes a third speed drive gear 85 supported so as to be axially movable and relatively non-rotatable by the second main shaft 27 and a third speed driven gear 86 supported in a relatively rotatable manner by the countershaft 28 and geared with the third speed drive gear 85; the fifth speed gear train G5 includes a fifth speed drive gear 87 supported in a relatively rotatable manner by the second main shaft 27 and a fifth speed driven gear 88 supported in an axially movable and relatively non-rotatable manner by the countershaft 28 and geared with the fifth speed drive gear 87; and the first speed gear train G1 includes a first speed drive gear 89 integrally arranged with the second main shaft 27 and a first speed driven gear 90 supported in a relatively rotatable manner by the countershaft 28 and geared with the first speed drive gear 89.

The third speed drive gear 85 is integrally arranged on a third shifter 91 supported in a relatively non-rotatable and axially movable manner by the second main shaft 27, and the third shifter 91 is switched to engage or disengage the fifth speed drive gear 87. A fourth shifter 92 is supported so as to be relatively non-rotatable and axially movable by the countershaft 28 between the third speed driven gear 86 and the first speed driven gear 90 to enable switching among state of engaging the third speed driven gear 86, state of engaging the first speed driven gear 90, and neutral state of not engaging either the third speed driven gear 86 or the first speed driven gear 90, and the fifth speed driven gear 88 is integrally arranged on the fourth shifter 92.

The first speed gear train G1 is established by engaging the fourth shifter 92 to the first speed driven gear 90 without the third shifter 91 engaging the fifth speed drive gear 87; the third speed gear train G3 is established by engaging the fourth shifter 92 to the third speed driven gear 86 without the third shifter 91 engaging the fifth speed drive gear 87; and the fifth speed gear train G5 is established by engaging the third shifter 91 to the fifth speed drive gear 87 with the fourth shifter 92 in the neutral state.

Figure 3:
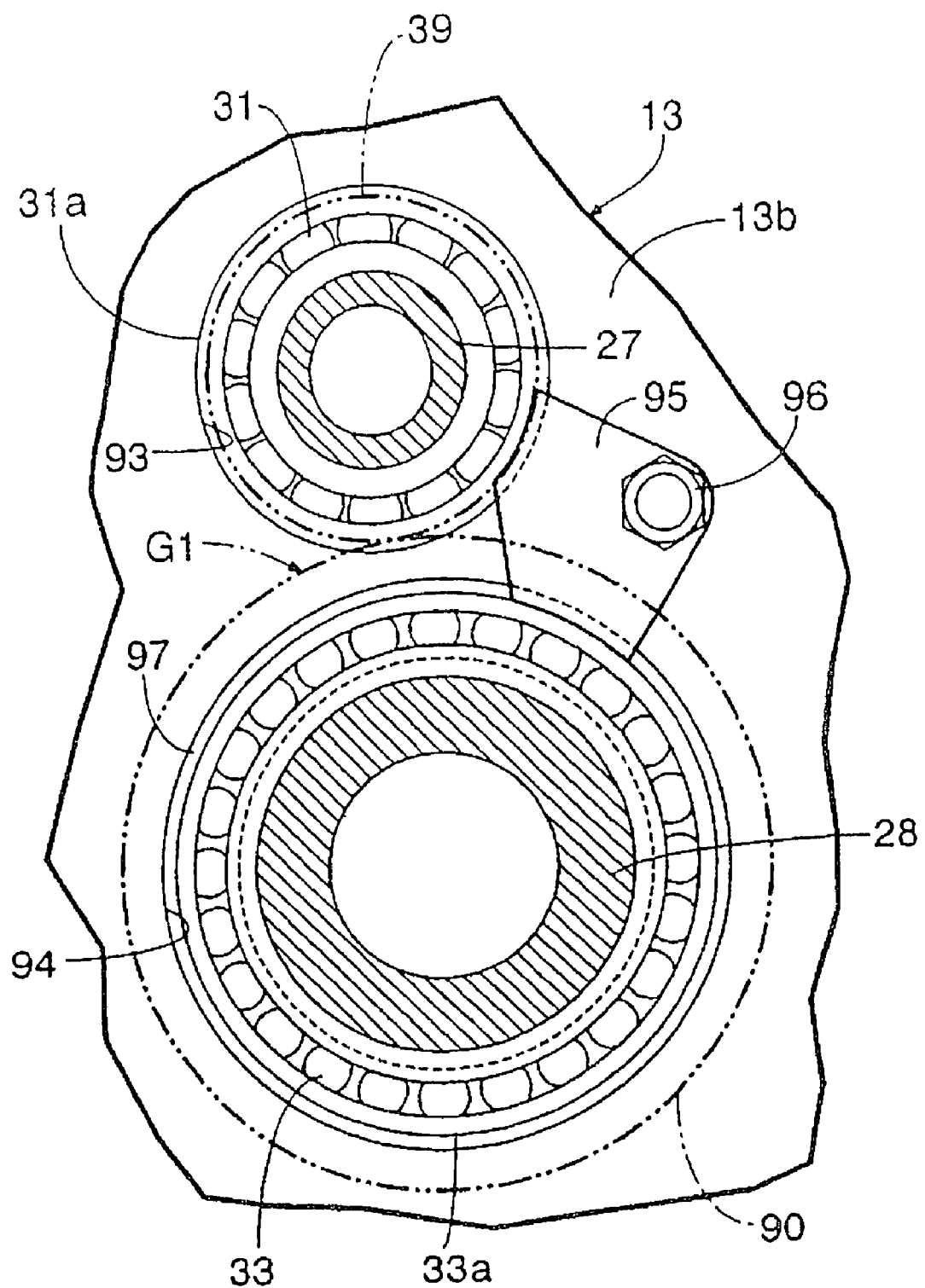
FIG. 3 is a cross sectional view taken along line 3-3 of FIG. 2.

With reference also to FIG. 3, the end on the side opposite to the first and second clutches 37, 38 of the second main shaft 27 is rotatably supported by the side wall 13b of the crankcase 13 in the engine main body 11 by way of the main shaft ball bearing 31, and an outer ring 31a of the main shaft ball bearing 31 is fitted to a supporting hole 93 formed in the side wall 13b from the inner side of the crankcase 13. Furthermore, the inner diameter of the supporting hole 93 and the outer diameter of the outer ring 31a are set to be larger than the outer diameter of the first speed drive gear 89 configuring one part of the first speed gear train G1 and integrally arranged on the second main shaft 27.

The outer ring 31a of the main shaft ball bearing 31 is sandwiched between a step part 93a formed on the supporting hole 93 and a fixed plate 95 fixed to the inner surface of the side wall 13b by a bolt 96 and engaged with the outer peripheral part of the outer ring 31a.

The end on the side opposite to the first and second clutches 37, 38 of the countershaft 28 is rotatably supported by the side wall 13b by way of the countershaft ball bearing 33, and an outer ring 33a of the countershaft ball bearing 33 is fitted to a supporting hole 94 formed in the side wall 13b so as to abut on a step part 94a formed on the supporting hole 94. The fixed plate 95 also engages the outer peripheral part of the outer ring 33a of the countershaft ball bearing 33, so that the outer rings 31a, 33a of the main shaft ball bearing 31 and the countershaft ball bearing 33 are fixed to the side plate 13b of the crankcase 13 with the common fixed plate 95.

One part of the countershaft ball bearing 33 is slightly projected from the inner surface of the side plate 13b, and the fixed plate 95 engages an annular concave part 97 formed on the outer periphery of the projection from the side plate 13b of the countershaft ball bearing 33, whereby the fixed plate 95 does not protrude inward from the inner end face of the countershaft ball bearing 33.

The first to fourth shifters 83, 84, 91, and 92 are rotatably held by first to fourth shift forks 98, 99, 100, and 101, and the shift forks 98 to 101 are driven in the axial direction of the main shafts 26, 27 and the countershaft 28 to activate the first to fourth shifters 83, 84, 91, 92 in the axial direction.

Figure 4:
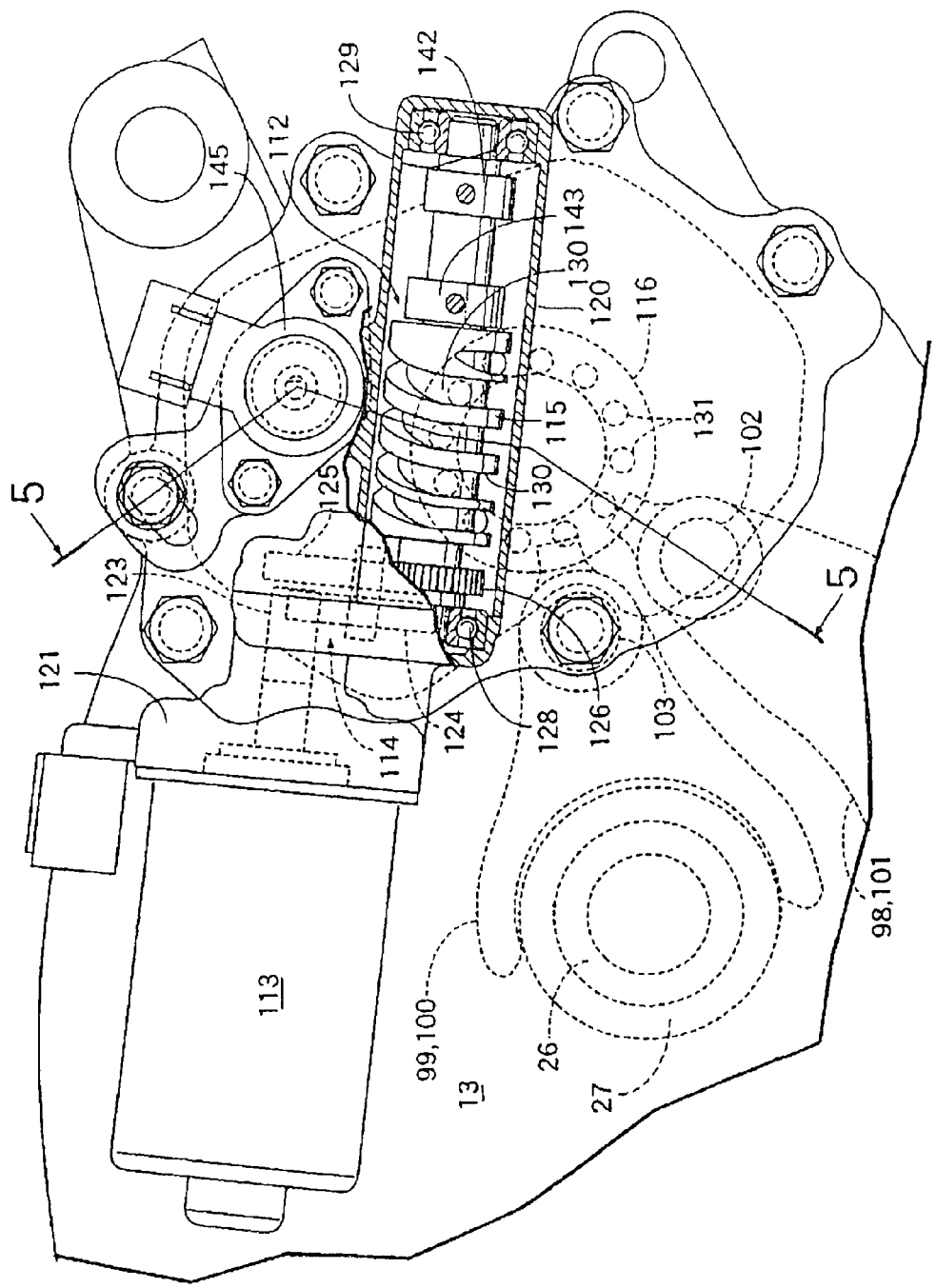
FIG. 4 is a partially cut-out enlarged view of a portion indicated by an arrow 4 of FIG. 1.
Figure 5:
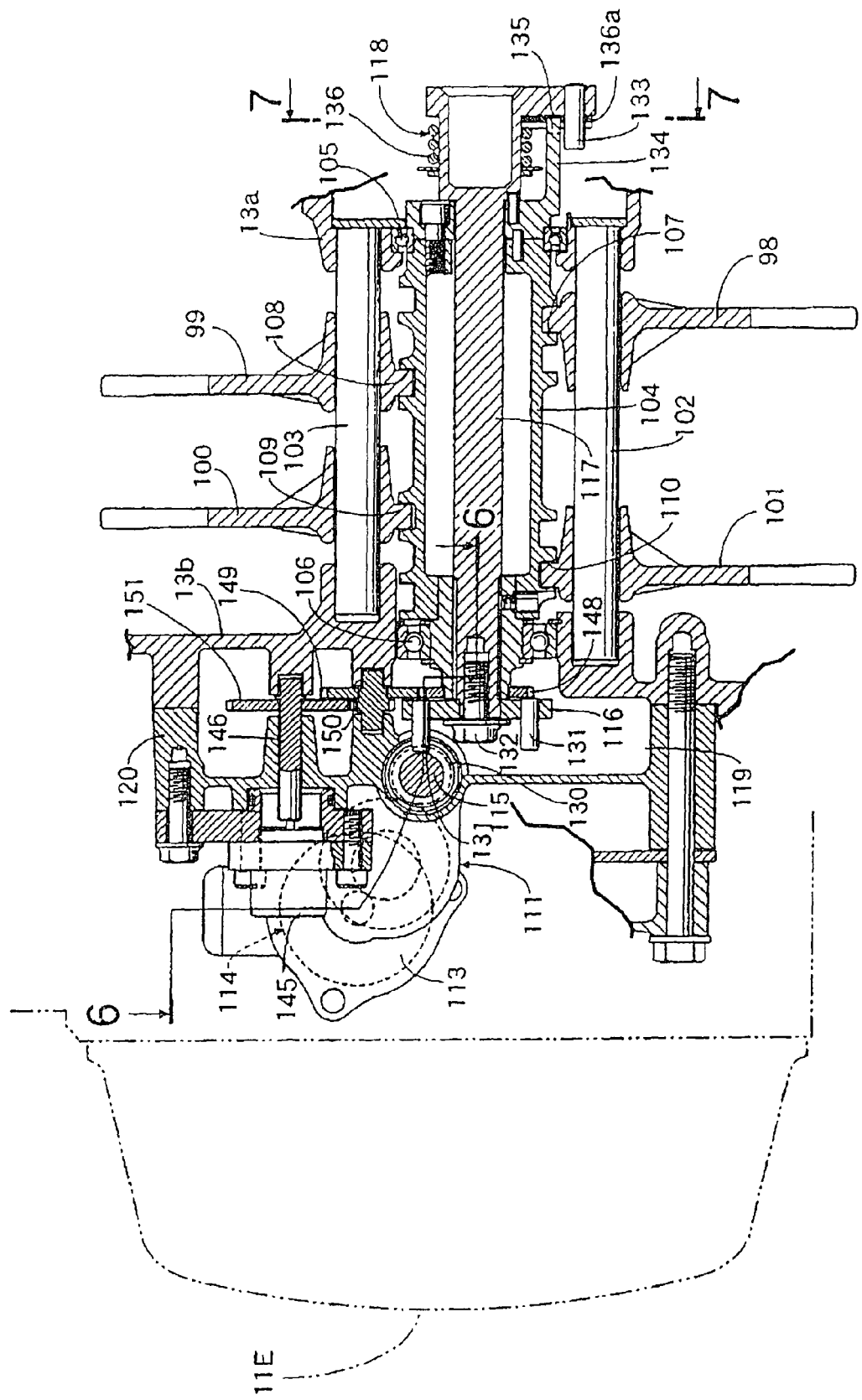
FIG. 5 is a cross sectional view taken along line 5-5 of FIG. 4.

In FIGS. 4 and 5, the first and fourth shift forks 98, 101 holding the first and fourth shifters 83, 92 are slidably supported by a first shift shaft 102 having an axis parallel to the axis of the main shafts 26, 27 and the countershaft 28 and having both ends supported at the side plates 13a, 13b of the crankcase 13; and the second and third shift forks 99, 100 holding the second and third shifters 84, 91 are slidably supported by a second shift shaft 103 having an axis parallel to the first shift shaft 102 and having both ends supported by the side plates 13a, 13b.

A shift drum 104 having an axis parallel to the axis of the crankshaft 12, that is, an axis along the left and right direction of the motorcycle is rotatably supported at the side plates 13a, 13b by way of ball bearings 105, 106, and pins 98a, 99a, 100a, and 101a arranged in the respective shift fork 98 to 101 are slidably engaged with first to fourth lead grooves 107, 108, 109, 110 formed on the outer periphery of the shift drum 104, so that each shift fork 98 to 101 slidably operates according to the shape of the first to fourth lead grooves 107 to 111 when the shift drum 104 rotates.

Figure 6:
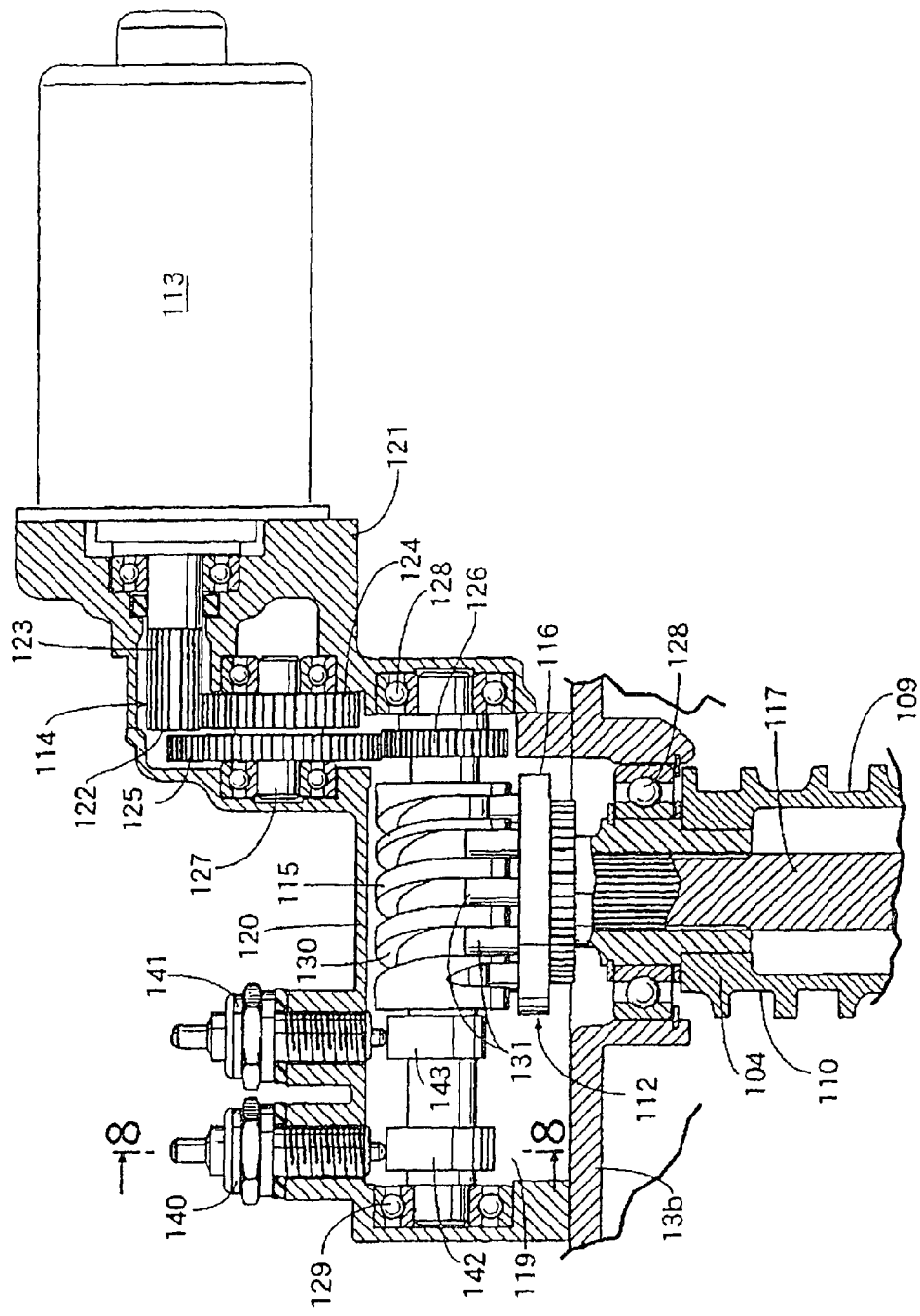
FIG. 6 is a cross sectional view taken along line 6-6 of FIG. 5.

With reference also to FIG. 6, the shift drum 104 is rotatably driven by a driving means 112, which driving means 112 includes an electric motor 113 arranged on one side along the axial direction of the shift drum 104, that is, the side opposite to the side arranged with the first and second clutches 37, 38 in the present embodiment, and having a rotation axis in a plane orthogonal to the axis of the shift drum 104, where the power exerted by the electric motor 113 is transmitted towards the other end in the axial direction of the shift drum 104, that is, to the end of the shift drum 104 on the side arranged with the first and second driving means 37, 38 in the present embodiment via a reduction gear mechanism 114, a barrel cam 115, a disc transmission rotation member 116, a transmission shaft 117 and a lost motion mechanism 118.

A case member 120 forming an operation chamber 119 for accommodating the reduction gear mechanism 114, the barrel cam 115, and the transmission rotation member 116 in between the side plate 13b is fixed to the outer surface of the side plate 13b of the crankcase 13, and the electric motor 113 is attached to a lid member 121 which is attached to the case member 120 in such manner as to block an opening end of the case member 120 so that a motor shaft 122 projects into the operation chamber 119.

The reduction gear mechanism 114 includes a drive gear 123 arranged on the motor shaft 122 of the electric motor 113, a first intermediate gear 124 gearing with a drive pinion 123, a second intermediate gear 125 rotating with the first intermediate gear 124, and a driven gear 126 arranged on the barrel cam 115 and gearing with the second intermediate gear 125.

First and second intermediate gears 124, 125 are arranged on a rotation shaft 127 having both ends rotatably supported by the case member 120 and the lid member 121, and both ends of the barrel cam 115 are rotatably supported by the case member 120 and the lid member 121 by way of the ball bearings 128, 129.

A cam groove 130 of spiral form is formed on the outer periphery of the barrel cam 115. The transmission rotation member 116 is arranged facing the outer periphery of the barrel cam 115 while being rotatable about the same axis as the shift drum 104, and a plurality of engagement pins 131 that selectively engages the cam groove 130 is formed in the circumferential direction at equal distance on the transmission rotation member 116. The rotational power is transmitted to the transmission rotation member 116 when the plurality of engagement pins 131 sequentially engages the cam groove 130 in response to the rotation of the barrel cam 115.

One end of the transmission shaft 117 that passes through the shift drum 104 coaxially and in a relatively rotatable manner is coupled to the transmission rotation member 116 coaxially and in a relatively non-rotatable manner with a bolt 132, and the lost motion mechanism 118 is arranged between the other end of the transmission shaft 117 and the other end of the shift drum 104.

Figure 7:
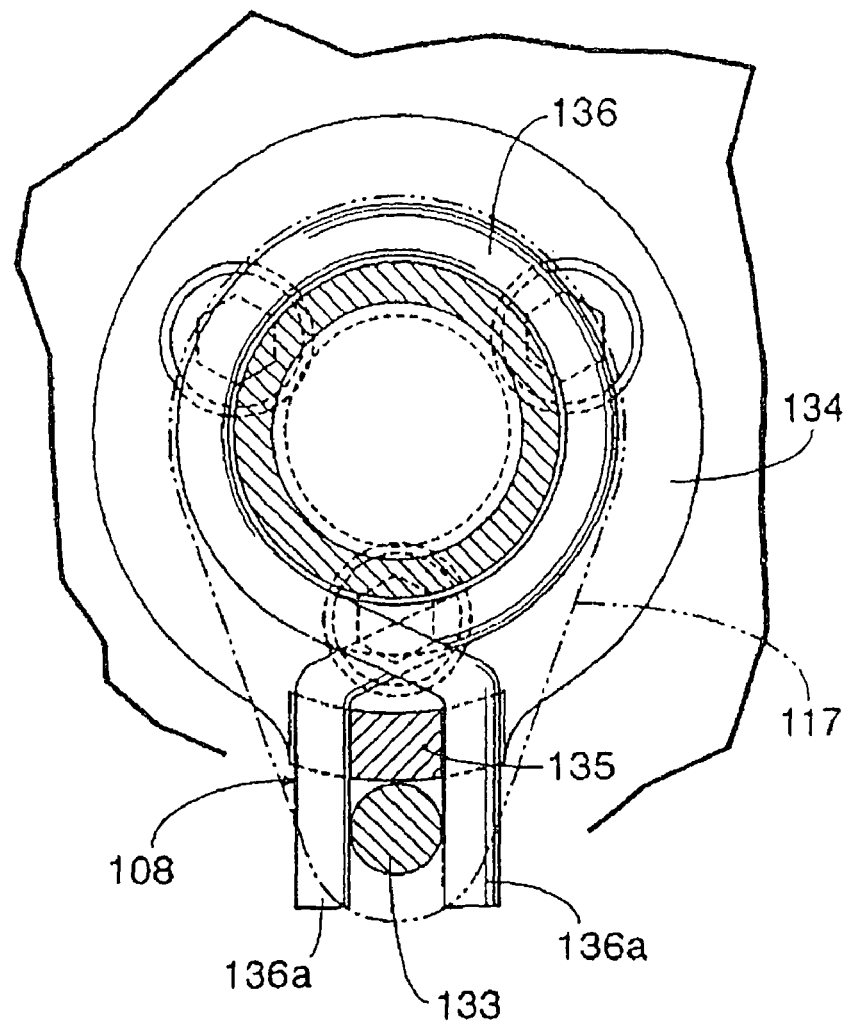
FIG. 7 is an enlarged cross sectional view taken along line 7-7 of FIG. 5.

As shown in FIG. 7, the lost motion mechanism 118 includes a pin 133 arranged at the other end side of the transmission shaft 117 so as to be offset from the rotation axis thereof, a transmission member 134 fixed to the other end of the shift drum 104 and arranged with a transmission projection 135 on the inner side of the pin 13 offset from the axis of the shift drum 104, and a snap spring 136 having a pair of snap strips 136a, 136a at both ends and being attached to the transmission shaft 117, where the pin 133 and the transmission projection 135 are arranged between the snap strips 136a, 136a.

When the pin 133 pushes one of the snap strips 136a in the turning direction by the turning of the transmission shaft 117, the other snap strip 136a pushes the transmission projection 135, whereby the turning force generated by the turning of the transmission shaft 117 is transmitted to the shift drum 104 via the lost motion mechanism 118 that produces play.

Figure 8:
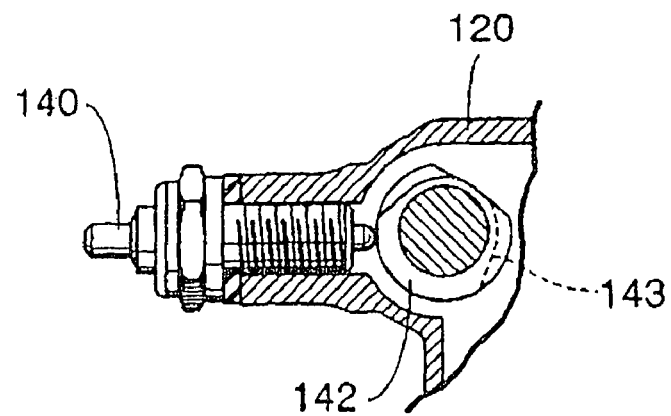
FIG. 8 is a cross sectional view taken along line 8-8 of FIG. 6.

The driving means 112 is configured to rotatably drive the shift drum 104 in such manner that the speed changes by one stage in one rotation of the barrel cam 115, and first and second switches 140, 141 are attached to the case member 120 to check whether or not the barrel cam 115 is rotating normally by the operation of the electric motor 113. As shown in FIG. 8, a first switch cam 142 that turns ON the first switch 140 by contacting the first switch 140 is arranged on the barrel cam 115 at the portion corresponding to the first switch 140, and a second switch cam 143 that turns ON the second switch 141 by contacting the second switch 141 is arranged on the barrel cam 115 at the portion corresponding to the second switch 141, where the first and second switch cams 142, 143 have the same shape but are arranged on the barrel cam 115 at different phases.

Figure 9:
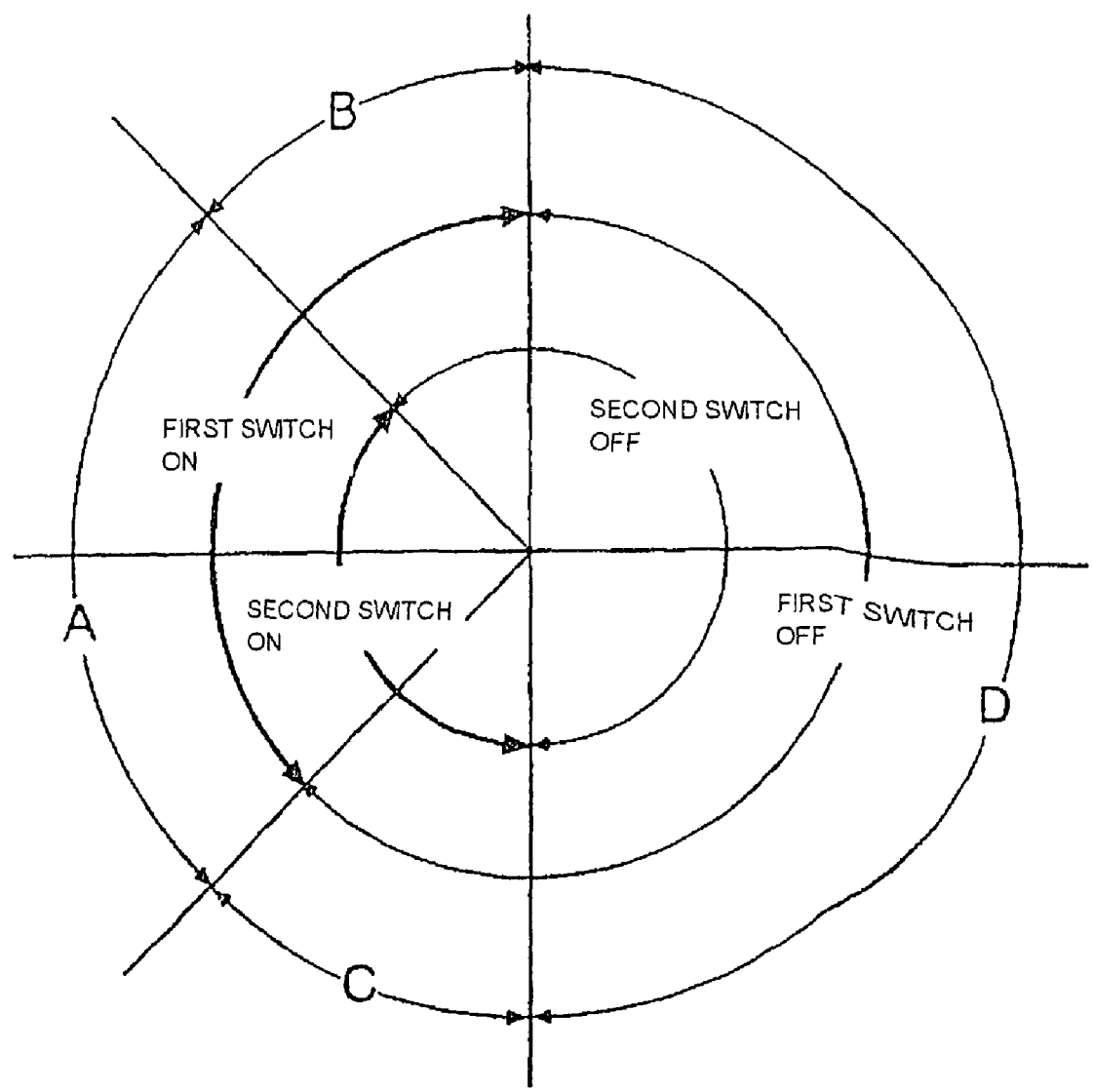
FIG. 9 is a view showing change in ON/OFF state of first and second switches.

ON/OFF of the first and second switches 140, 141 corresponding to the rotation of the barrel cam 115 changes as shown in FIG. 9, where a region A where both switches 140, 141 are turned ON, a region B where the first switch 140 is turned ON but the second switch 141 is turned OFF, a region C where the second switch 141 is turned ON but the first switch 140 is turned OFF, a region D where both switches 140, 141 are turned OFF are defined by the rotation of the barrel cam 115, so that the operation state of the barrel cam 115 can be checked by detecting the ON/OFF of the first and second switches 140, 141.

A shift sensor 145 for detecting the turning position of the shift drum 104 is attached to the case member 120, and a detection shaft 146 of the shift sensor 145 is rotatably supported by the side wall 13b of the crankcase 13 and the case member 120.

A third intermediate gear 149 is geared to a drive gear 148 that rotates with the shift drum 104, and a driven gear 151 arranged on the detection shaft 145 is geared to a fourth intermediate gear 150 that rotates with the third intermediate gear 149.

Therefore, the driving means 112 is arranged in the crankcase 13 of the engine main body 11 on the inner side of the outermost end position (portion indicated by chain line 11E of FIG. 5) of the engine main body 11 in the direction of the axis of the shift drum 104.

The action of the embodiment will now be described, where the driving means 112 is miniaturized, concentrated arrangement of the driving means 112 at one side in the axial direction of the shift drum 104 is avoided, and the internal combustion engine is miniaturized since the drive means 112 for rotatably driving the shift drum 104 includes the electric motor 113 arranged at one end side in the axial direction of the shift drum 104, and a transmission shaft 117 transmitted with power from the electric motor 113 on one end side in the axial direction of the shift drum 104, where the transmission shaft 117 passes through the shift drum 104 coaxially and in a relatively rotatably manner, and an index mechanism configured by barrel cam 115 and transmission rotation member 116 and the lost motion mechanism 118 are distributed on both sides along the axial direction of the shift drum 104.

Furthermore, since the driving means 112 includes the electric motor 113 having the rotation axis in a plane orthogonal to the axis of the shift drum 104, the barrel cam 115 that rotates about the axis parallel to the electric motor 113 by the power transmission from the electric motor 113 and that has the cam groove 130 formed on the outer periphery, and the transmission rotation member 116 interlocked and coupled to the shift drum 104 so as to be rotatable about the axis orthogonal to the rotation axis of the barrel cam 115 and arranged with the plurality of engagement pins 131 that selectively engages the cam groove 130, the power of the electric motor 113 is transmitted to the shift drum 104 side via the barrel cam 115 and the transmission rotation member 116, whereby the projecting amount of the electric motor 113 from the engine main body 11 in the direction of the axis of the shift drum 104 is suppressed and the shift drum 104 and the electric motor 113 are arranged close to each other thereby miniaturizing the driving means 112 and improving the shift accuracy.

The bank angle can be set relatively large while suppressing the projecting amount in the width direction of the motorcycle since the axis of the shift drum 104 lies along the left and right direction of the motorcycle.

The driving means 112 is protected by the engine main body 11 even if the motorcycle falls since the driving means 112 is arranged in the engine main body 11 on the inner side from the outermost end position (portion indicated by chain line 11E of FIG. 5) of the engine main body 11 along the axis of the shift drum 104.

A plurality of odd-numbered speed gear trains G1, G3, G5 are arranged between the second main shaft 27 that passes through the first main shaft 26 coaxially and in a relatively rotatable manner and the countershaft 28 with the first speed gear train G1 arranged on the side opposite to the first and second clutches 37, 38; the end on the side opposite to the first and second clutches 37, 38 of the second main shaft 27 is rotatably supported by the side wall 13b of the crankcase 13 in the engine main body 11 by way of the main shaft ball bearing 31 having a diameter larger than the outer diameter of the first speed gear drive gear 89; and the outer ring 31a of the main shaft ball bearing 31 is fixed to the side wall 13b with the fixed plate 95 that engages the outer peripheral part of the outer ring 31a.

Therefore, the fixed plate 95 can be engaged with the outer ring 31a of the main shaft ball bearing 31 such that the fixed speed drive gear 89 does not interfere with the fixed plate 95 even if arranged close to the side plate 13b, and the first speed drive gear 89 can be arranged close to the side plate 13b in the direction of the axis of the second main shaft 27, whereby the transmission system can be miniaturized along the axis of the second main shaft 27.

The outer ring 33a of the countershaft ball bearing 33 that rotatably supports the end on the side opposite to the first and second clutches 37, 38 of the countershaft 28 at the side plate 13b is also fixed to the side plate 13b by the fixed plate 95, whereby the outer rings 31a, 33a of the main shaft ball bearing 31 and the countershaft ball bearing 33 are fixed at the side plate 13b with a single common fixed plate 95 so that the number of components can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed change control device of a vehicular transmission in which shift forks for selectively establishing gear trains of a plurality of speed change stages arranged between main shafts transmitted with power from an internal combustion engine and a countershaft connected to drive wheels are engaged with lead grooves formed on an outer periphery of a shift drum, and in which a driving means including an electric motor and rotatably driving the shift drum with power exerted by the electric motor is connected to the shift drum;

wherein the driving means includes,
the electric motor having a rotation axis in a plane orthogonal to an axis of the shift drum;
a barrel cam that rotates about an axis parallel to the electric motor by power transmission from the electric motor and that has a cam groove formed on an outer periphery; and
a transmission rotation member interlocked and coupled to the shift drum so as to be rotatable about an axis orthogonal to the rotation axis of the barrel cam and arranged with a plurality of engagement pins that selectively engages the cam groove.

2. The speed change control device of the vehicular transmission according to claim 1,
wherein the internal combustion engine is mounted on a motorcycle with the axis of the shift drum lying in left and right direction.

3. The speed change control device of the vehicular transmission according to claim 2,
wherein the driving means is arranged adjacent to one end of the shift drum.

4. The speed change control device of the vehicular transmission according to claim 1, further comprising a transmission shaft that passes through the shift drum coaxially, the transmission shaft and the shift drum being rotatably mounted between side plates of a crankcase of the internal combustion engine.

5. The speed change control device of the vehicular transmission according to claim 4, wherein the transmission rotation member is mounted on one end of a transmission shaft in a position outside of the crankcase.

6. The speed change control device of the vehicular transmission according to claim 1, further comprising a case member fixed to one side of a crankcase, the case member forming an operation chamber for accommodating the barrel cam and the transmission rotation member.

7. The speed change control device of the vehicular transmission according to claim 6, wherein the electric motor is mounted on a lid member attached to a forward side of the case member, and
   wherein a motor shaft of the electric motor projects rearwardly from the electric motor into the operation chamber.

8. The speed change control device of the vehicular transmission according to claim 1, wherein the electric motor is disposed in a position that is higher than the main shafts.

9. The speed change control device of the vehicular transmission according to claim 1, wherein the shift drum is disposed in a position that is rearward with respect to the main shafts.

10. The speed change control device of the vehicular transmission according to claim 1, wherein the electric motor in mounted inwardly with respect to an outermost side position of the a main body of the internal combustion engine.

11. A speed change control device of a vehicular transmission in which shift forks for selectively establishing gear trains of a plurality of speed change stages arranged between main shafts transmitted with power from an internal combustion engine and a countershaft connected to drive wheels are engaged with lead grooves formed on an outer periphery of a shift drum, the speed control device comprising:
   driving means including:
      an electric motor having a rotation axis in a plane orthogonal to an axis of the shift drum, the electric motor connected to and rotatably driving the shift drum with power exerted by the electric motor;
      a barrel cam having a cam groove formed on an outer periphery thereof that rotates about an axis parallel to the electric motor by power transmission from the electric motor; and
      a transmission rotation member interlocked and coupled to the shift drum so as to be rotatable about an axis orthogonal to the rotation axis of the barrel cam,
      wherein the transmission rotation member includes multiple engagement pins that selectively engage the cam groove.

12. The speed change control device of the vehicular transmission according to claim 11,
   wherein the internal combustion engine is mounted on a motorcycle with the axis of the shift drum lying in left and right direction.

13. The speed change control device of the vehicular transmission according to claim 12,
   wherein the driving means is arranged adjacent to one end of the shift drum.

14. The speed change control device of the vehicular transmission according to claim 11, further comprising a transmission shaft that passes through the shift drum coaxially, the transmission shaft and the shift drum being rotatably mounted between side plates of a crankcase of the internal combustion engine.

15. The speed change control device of the vehicular transmission according to claim 14, wherein the transmission rotation member is mounted on one end of a transmission shaft in a position outside of the crankcase.

16. The speed change control device of the vehicular transmission according to claim 11, further comprising a case member fixed to one side of a crankcase, the case member forming an operation chamber for accommodating the barrel cam and the transmission rotation member.

17. The speed change control device of the vehicular transmission according to claim 16, wherein the electric motor is mounted on a lid member attached to a forward side of the case member, and
   wherein a motor shaft of the electric motor projects rearwardly from the electric motor into the operation chamber.

18. The speed change control device of the vehicular transmission according to claim 11, wherein the electric motor is disposed in a position that is higher than the main shafts.

19. The speed change control device of the vehicular transmission according to claim 11, wherein the shift drum is disposed in a position that is rearward with respect to the main shafts.

20. The speed change control device of the vehicular transmission according to claim 11, wherein the electric motor in mounted inwardly with respect to an outermost side position of the a main body of the internal combustion engine.

* * * * *